Dec. 12, 1944.　　J. M. CHRISTMAN　　2,364,947
APPARATUS FOR CROWNING GEAR TEETH
Filed Sept. 12, 1939　　3 Sheets-Sheet 1

INVENTOR.
John M. Christman
Sibbetts & Hart
ATTORNEYS

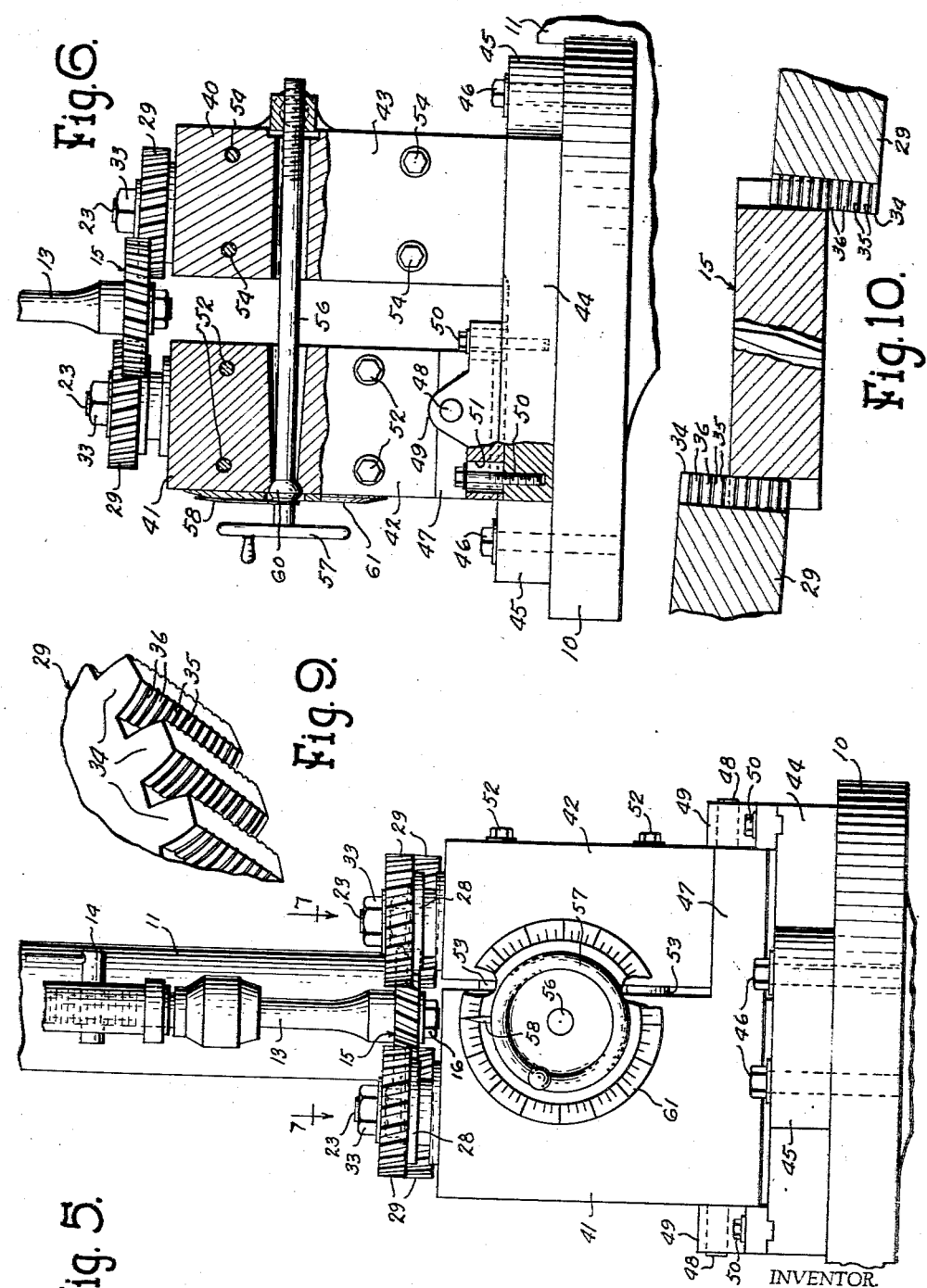

Dec. 12, 1944.  J. M. CHRISTMAN  2,364,947
APPARATUS FOR CROWNING GEAR TEETH
Filed Sept. 12, 1939   3 Sheets-Sheet 3

INVENTOR.
John M. Christman
BY
Sibbetts & Hart
ATTORNEYS

Patented Dec. 12, 1944

2,364,947

UNITED STATES PATENT OFFICE 2,364,947

APPARATUS FOR CROWNING GEAR TEETH

John M. Christman, Detroit, Mich., assignor to Packard Motor Car Company, Detroit, Mich., a corporation of Michigan Application September 12, 1939, Serial No. 294,519

7 Claims. (Cl. 90—1.6)

This invention relates to an apparatus for crowning the teeth of a gear.

An object of the invention is to simultaneously finish both ends of gear teeth so that they will be crowned uniformly and smooth enough for quiet operation.

Another object of the invention is to provide a machine for crowning the teeth of a gear by a simultaneous cutting and burnishing operation with a plurality of cutters that are solidly centered.

A further object of the invention is to provide a machine for simultaneously crowning both ends of the teeth of a gear through meshing engagement with a plurality of rotatably cutting and burnishing devices of gear form.

Other objects of the invention will appear from the following description taken in connection with the drawings, which form a part of this specification, and in which:

Fig. 5 is an elevational view of another form of machine that can be employed to carry out the invention and with which both ends of the gear teeth can be crowned simultaneously;

Fig. 6 is another elevational view of the machine shown in Fig. 5, partly broken away to show adjustment features;

Fig. 9 is a fragmentary perspective view of one of the cutter members;

Fig. 10 is a diagrammatic view similar to a portion of Fig. 8, illustrating the relation between a gear and intermeshing cutters.

Figure 1:
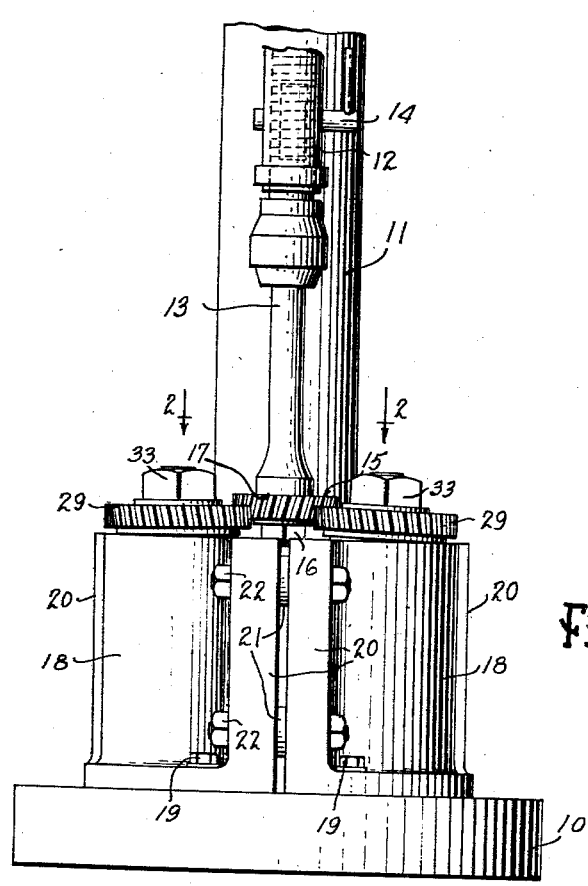
Fig. 1 is an elevational view of a machine incorporating the invention and by means of which a method of crowning teeth of a gear can be accomplished.
Figure 3:
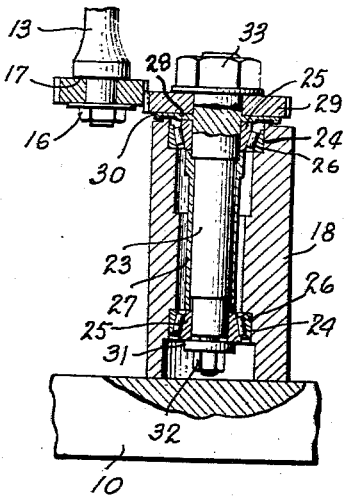
Fig. 3 is a vertical sectional view of the machine taken on line 3—3 of Fig. 2.

Referring now more particularly to Figs. 1 to 4 inclusive, and 9, the embodiment of the invention illustrated therein has to do with gear tooth crowning by the simultaneously shaving and burnishing of one end of the teeth of the gear during each operation. With this machine it is necessary to reverse the gear on its holder after crowning one end of the teeth in order to crown the other end of the teeth.

This machine includes a supporting structure having a base 10 to the rear portion of which is fixed a standard 11. Carried by the standard is a sleeve 12 in which is mounted a spindle 13 arranged to be rotated by a suitable source of power, such as a motor. Suitable control means 14, of any conventional design, is associated with the sleeve and the spindle to raise and lower the same without disconnecting the spindle drive. The work gear 15, the teeth of which are to be crowned, is fixed to the lower end of the spindle by a suitable securing device in the form of a nut 16 that holds the gear tightly against the spindle shoulder 17. The work gear to be crowned is illustrated as having end portions of similar pitch diameter.

A plurality of cutter supporting members, in the form of castings 18 and preferably three in number, are fixed to the base 10 by bolts 19 and each has a pair of angularly disposed flanges 20 extending therefrom. The members are arranged substantially in a circle on the base and flanges 20 of the adjacent members are separated by shims 21 and secured rigidly together by bolts 22, the shims being of selected thickness to properly associate the members with respect to the work gear on the spindle.

Each of the supporting members 18 is hollow and accommodates a spindle 23. Upper and lower bearings for the spindles are arranged in the castings and such bearings each consist of an outer race 24 fixed in the casting, an inner race 25 pressed on the spindle and rollers 26. Between the inner races 25 on each spindle is arranged a spacer sleeve 27. Projecting from each spindle is an annular bearing flange 28 on which a cutter 29 is seated, such flange having the peripheral portion 30 thereof extending beyond the upper hollow portion of the casting 18 to prevent metal chips from falling into the bearing thereunder. A washer 31 encircles each spindle and engages the inner race of the lower bearing and is retained in such position by means of a nut 32. A nut 33 is screwed upon the upper end of each spindle and serves to secure the cutter 29 on the spindle and against the flange 28. The nut 32 is drawn up to load the bearings as may be desired while the nut 33 serves as a securing means for the cutter.

The cutters, illustrated in detail in Fig. 9, are similar in form to the work gear and have peripheral teeth 34 with their faces formed with slots 35 providing cutting edges at their junction with the surfaces 36 therebetween. Such surfaces 36 act as burnishing surfaces upon the teeth of the gear with which they intermesh. This form of cutter is known in the art and has been previously used to simultaneously shave and burnish the teeth of a gear when in mesh therewith and upon rotation thereof. These cutters when used in the manner herein described will crown either one or both ends of the teeth of a gear. The spindles that carry the cutter are arranged to extend at an angle to the axis of the work gear as carried by the spindle 13 so that the axes of the cutters will extend at an acute angle to the axis of the work gear when intermeshed therewith. As this acute angle can be varied, the degree of crowning can thus be controlled. In the embodiment of the invention shown in Figs. 1 to 3 inclusive, the cutters are shown similarly meshing with only the lower portion of the work gear teeth and they will of course shave and burnish only the one end of the faces of the teeth. To crown the other end of the gear teeth it is necessary to reverse the position of the work gear upon the spindle 13 and to repeat the operation. The cutter spindles are accurately held in fixed relationship due to the bolted-together supporting members 18 and radial pressure between the meshing teeth of the cutters and the gear being operated upon is obtained by a downward pressure against the spindle 13 which can be manually exerted by the spindle raising and lowering means 14. Thus the cutter supports will not flex and change the centers of the cutters with respect to the work gear.

Figure 4:
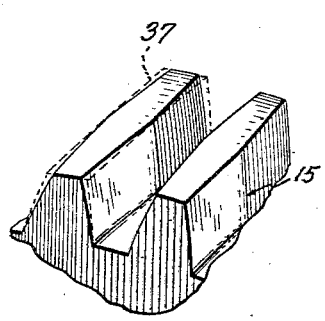
Fig. 4 is a fragmentary perspective view of a gear having the teeth crowned by the method and with the machine incorporating the invention.
Figure 2:
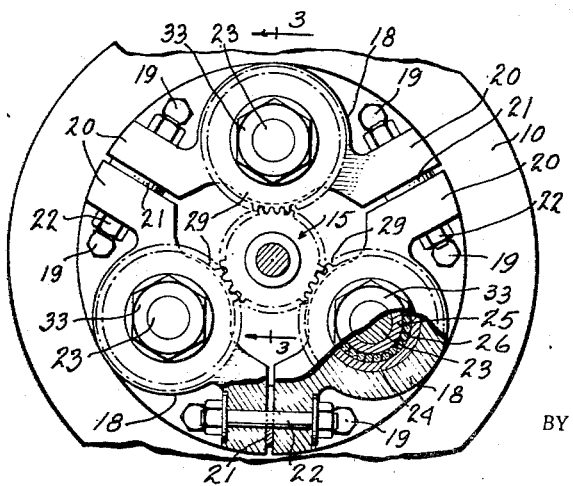
Fig. 2 is a sectional view taken on line 2—2 of Fig. 1.
Figure 7:
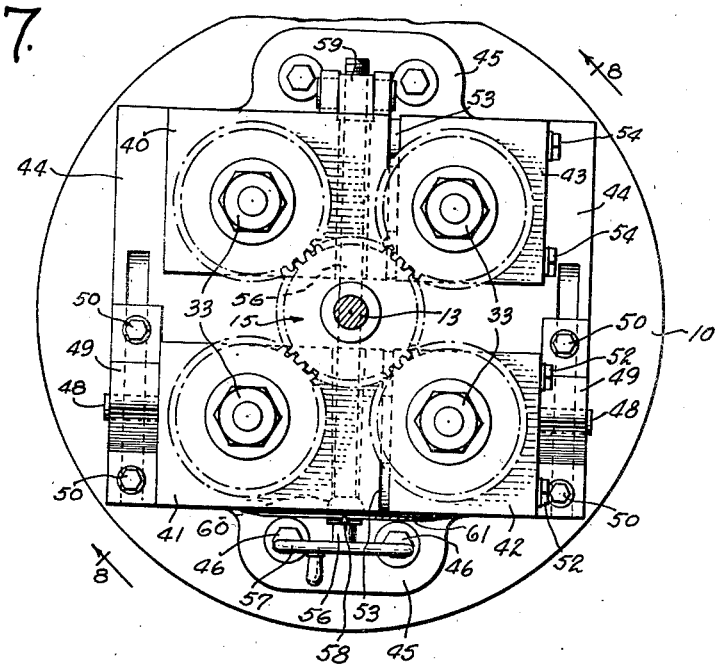
Fig. 7 is a sectional plan view of the machine looking in the direction of the arrows 7—7 of Fig. 5.
Figure 8:
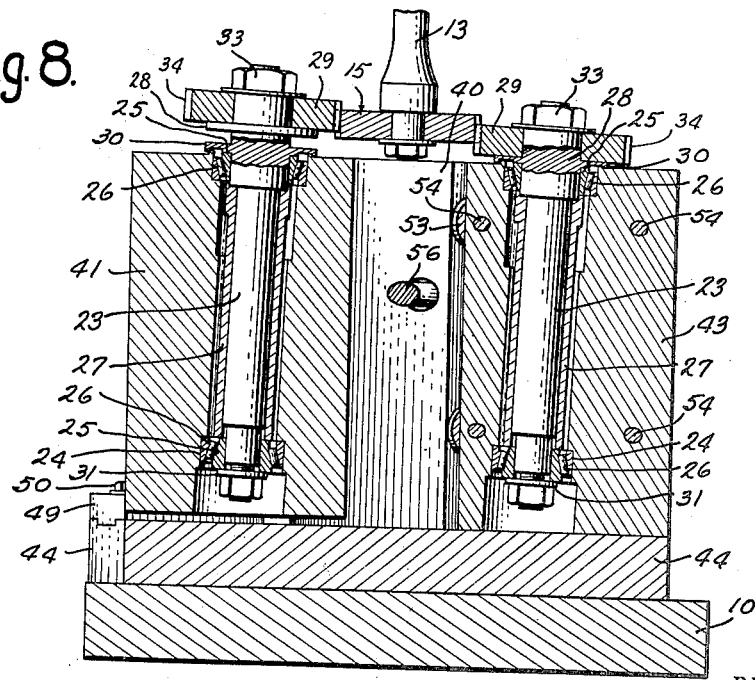
Fig. 8 is a sectional view on line 8—8 of Fig. 7.

When the spindle 13 is raised the work gear can be fixed to or removed from the end thereof. After the work gear is attached to the spindle it is lowered until it meshes with the teeth of the cutters and then the spindle is rapidly rotated while applying downward pressure thereagainst. The cutters are free to be rotated with the work gear and such rotation with the radial pressure causes the cutting edges formed by the grooves 35 to shave off metal from the teeth of the work gear and at the same time the same portion of the faces of the teeth of the work gear being shaved will be burnished by the following cutter surfaces 36. Due to the angular relation of the axes of the cutters relative to the axis of the work gear, a greater amount of metal will be removed from the ends of the teeth than toward the middle of the teeth and the resulting tooth form will be of a crowned nature, as shown in Fig. 4, the original form of the gear teeth being shown by dotted lines at 37. As the cutter supporting members are held rigid during the operation, the ends of the gear teeth will be uniformly crowned and the burnishing action leaves the crowned portion of gear teeth faces smooth enough to provide quiet operation when running in mesh with another work gear. This smoothness has been found to be of such a character that a lapping operation is not required in order to obtain average quiet running gears.

In the form of the invention shown in Figs. 5 to 10 inclusive, the machine is designed to simultaneously crown both ends of the teeth of the work gear by the same method as previously described. The base 10, standard 11, and spindle support and control are the same in this form of the invention as previously described.

Cutter supporting members 40, 41, 42 and 43 are arranged on the base 10. The supporting member 40 includes a base flange 44 that has ears 45 extending therefrom and secured to the base 10 by bolts 46. The supporting member 41 is mounted upon the base flange 44 adjacent the upstanding portion of the supporting member 40 and includes a lateral base flange 47 upon which supporting member 42 is mounted. Supporting member 43 is mounted upon the base flange 44 of supporting member 40. These four supporting members, when assembled, form a substantially square structure that centrally underlies the gear carrying spindle 13. Each of the four supporting members is provided with a cutter and spindle corresponding to those previously described, and the bearings and securing means for the spindles are also the same as previously described. Similar reference characters will be used for similar parts in both embodiments of the invention.

The cutters are arranged in two sets, preferably two in each set, and the sets intermesh with opposite ends of the gear to be crowned. With the present showing the rear cutters carried by the supporting members 40 and 43 mesh with the lower end of the work gear teeth while the cutters carried by the supporting means 41 and 42 at the front of the machine engage with the upper ends of the teeth of the work gear. The cutter spindles in this form of the invention are arranged so that the cutter axes are in an angular relationship with the axis of the gear to be crowned and the spindles for the rear cutters are parallel with the spindles for the front cutters.

A pair of pins 48 extends one from each end of the base of the supporting member 41 and they are mounted in journal brackets 49 fixed on the base flange 44 of the supporting member 40 by bolts 50. These bolts pass through elongated slots 51 in the brackets allowing fore and aft adjustment of the member 41 when the bolts 50 are loosened. The member 42 is secured to the member 41 by horizontally extending bolts 52 and between such members can be arranged shims 53 to vary the distance between the axes of the spindles carried thereby. As the supporting member 41 is fixed to rotate and carries the member 42, the cutters carried by such members can be swung fore and aft with relation to the axes of the rear cutters and the work gear. The cutter supporting member 43 can be shimmed from the cutter member 40 in the same manner as just described and horizontal bolts 54 secure these members 43 and 40 rigidly together.

The radial pressure between the cutters and the gear to be crowned is obtained with this form of the invention by moving the members 41 and 42 toward the members 40 and 43 and this is made possible by the journal support for the member 41. In order to manually effect the desired radial pressure, a shaft 56 is arranged to extend fore and aft through the supporting members 40 and 41, and fixed on the front end of this shaft is a hand wheel 57 and a pointer 58. The rear end of this shaft is threaded into a block 59 carried by the member 40 and sufficient clearance is provided in such members around the shaft to permit rocking of the member 41 on its pivot. The shaft has a ball enlargement 60 engaging in the recess at the forward end of the opening in the supporting member 41 and turning of the shaft will move the front cutters toward or away from the rear cutters, depending upon the direction in which the hand wheel is rotated. On the front face of the member 41 is a dial 61 with which the pointer is associated to indicate the degree of shaft rotation so that the distance between the front and rear cutters can be visualized.

While the two sets of cutters are intermeshed with the work gear, the spindle 13 cannot be raised, but by rocking the top of the supporting member 41 outwardly sufficient clearance can be had to permit elevation of the work gear. By the use of desired shims 53 between the supporting members 41 and 42 and between supporting members 40 and 43, the desired distance between the cutters carried thereby can be regulated. Also, fore and aft adjustment of the member 41 will regulate the distance between the front and rear sets of cutters. By means of such adjustments the cutters can be properly set to uniformly intermesh with the work gear.

When the sets of cutters are intermeshed with the work gear, the spindle 13 is rotated and radial pressure is exerted by turning the hand wheel 57. As the axes of the two sets of cutters are in an acute angular relation to the axis of the work gear and as there is one set of cutters engaging each end portion of the work gear teeth, such engaged portions will be crowned and smoothed simultaneously by a shaping and burnishing operation as previously described.

This method of crowning gear teeth requires only a few revolutions of the work gear spindle. As the cutters are in a fixed relationship the crowned teeth of the work gear will be substantially uniform and the burnishing operation produces such a smooth tooth surface that lapping is not required to secure quiet operation when meshed with another work gear similarly finished.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a machine for simultaneously crowning both ends of the teeth of a gear having similar end pitch circles, spindle means on which a gear to be crowned is fixed, two sets of cutters similar to the gear in form having the faces of their teeth formed with shaving edges and burnishing portions, means for rotatably supporting the sets of cutters in intermeshing relation, one with each end portion only of the gear, and with the axis of the sets of cutters disposed in acute angular relationship with the gear axis, and means operable to swing one of the sets of cutters in a direction to apply radial pressure between both sets of cutters and the gear.

2. In a machine for simultaneously crowning both ends of the teeth of a gear having similar end pitch diameters, spindle means on which a gear to be crowned is fixed, a plurality of supporting members, a cutter similar in form to the gear having faces of its teeth formed with shaving edges and burnishing portions rotatably mounted on each supporting member, said cutters being arranged in two sets, said sets intermeshing with opposite end portions only of the teeth of the gear and having their axes at an acute angle to the gear axis, adjustable means fixing the supporting members of each set in desired spaced relationship, and means operable to move the supporting members of one set of cutters as a unit relative to the supporting members of the other set of cutters to thereby intermesh or unmesh the cutters from the gear and to apply radial pressure between the cutters and the gear.

3. In a machine for simultaneously crowning both ends of the teeth of a gear having similar end pitch diameters, spindle means on which a gear to be crowned is fixed, a plurality of supporting members arranged in two sets, a cutter similar in form to the gear having faces of its teeth formed with shaving edges and burnishing portions rotatably mounted on each of the supporting members, said cutters being arranged in two sets, said sets intermeshing with opposite end portions only of the teeth of the gear and having their axes at an acute angle to the gear axis, and means for swinging the supporting members for one set of cutters relative to the supporting members for the other set of cutters.

4. In a machine for simultaneously crowning both ends of the teeth of a gear, spindle means on which a gear to be crowned is fixed, a plurality of supporting members, a cutter of gear form having surfaces of its teeth formed with shaving edges and burnishing portions rotatably mounted on each supporting member, said cutters being arranged in two sets, said sets intermeshing one with one end of the teeth of the gear and the other with the other end of the teeth of the gear and having their axes at an angle to the gear axis, adjustable means fixing the supporting members of each set of cutters in desired spaced relationship, means for pivotally mounting the supporting members of one of the set of cutters, and means operable to swing said pivotally mounted supporting members upon their pivot.

5. In a machine for simultaneously crowning both ends of the teeth of a gear, spindle means on which a gear to be crowned is fixed, a plurality of supporting members, a cutter of gear form having surfaces of its teeth formed with shaving edges and burnishing portions rotatably mounted on each supporting member, said cutters being arranged in two sets, said sets intermeshing one with one end of the teeth of the gear and the other with the other end of the teeth of the gear and having their axes arranged at an angle to the gear axis, adjustable means fixing the supporting members of each set of cutters in desired spaced relationship, means for pivotally mounting the supporting members of one of the sets of cutters, a shaft associated with the supporting members for the two sets of cutters and manually operable to swing one of the set of cutters toward and away from the other set of cutters.

6. In a machine for simultaneously crowning both ends of the teeth of a gear, spindle means on which a gear to be crowned is fixed, a plurality of supporting members, a cutter of gear form having surfaces of its teeth formed with shaving edges and burnishing portions rotatably mounted on each supporting member, said cutters being arranged in two sets, said sets intermeshing one with one end of the teeth of the gear and the other with the other end of the teeth of the gear and having their axes arranged at an angle to the gear axis, adjustable means fixing the supporting members of each set of cutters in desired spaced relationship, means for pivotally mounting the supporting members of one of the sets of cutters, a shaft associated with the supporting members for the two sets of cutters and manually operable to swing one of the set of cutters toward and away from the other set of cutters, and indicator means associated with said shaft to register the degree of swinging movement of the cutter supporting members.

7. In a machine for simultaneously crowning both ends of the teeth of a gear, a base, a standard fixed to the base, rotatable spindle means carried by the standard and operable to rotate a gear to be crowned, a plurality of supporting members, one of which is fixed to the base and the others of which are adjustably fixed on the member fixed to the base, a cutter of gear form having the faces of its teeth formed with shaving edges and burnishing portions rotatably mounted on each supporting member, said cutters being arranged in two sets, said sets intermeshing one with one end of the gear teeth and the other with the other end of the gear teeth and with their axes at an angle to the gear axis, and means associated with said supporting members to move one set of cutters radially with respect to the other set of cutters.

JOHN M. CHRISTMAN.